(12) United States Patent
Lee et al.

(10) Patent No.: US 12,309,353 B2
(45) Date of Patent: May 20, 2025

(54) IMAGE SENSOR TEST SYSTEM INCLUDING OPERATIONAL AMPLIFIER AND LOW-FREQUENCY ATTENUATOR

(71) Applicant: SAMSUNG ELECTRONICS CO., LTD., Suwon-si (KR)

(72) Inventors: Seongkwan Lee, Suwon-si (KR);
Minho Kang, Suwon-si (KR);
Cheolmin Park, Suwon-si (KR);
Hyungsun Ryu, Suwon-si (KR);
Jaemoo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 200 days.

(21) Appl. No.: 18/071,021

(22) Filed: Nov. 29, 2022

(65) Prior Publication Data
US 2023/0362350 A1    Nov. 9, 2023

(30) Foreign Application Priority Data
May 9, 2022 (KR) .................. 10-2022-0056548

(51) Int. Cl.
*H04N 17/00* (2006.01)
*H04N 25/76* (2023.01)

(52) U.S. Cl.
CPC ........... *H04N 17/002* (2013.01); *H04N 25/76* (2023.01)

(58) Field of Classification Search
CPC .. H04N 17/002; H04N 25/76; G01R 31/2829; G01R 1/073; G01R 31/2839; G01R 31/2843; G01R 31/2844

USPC ...................................................... 348/222.1
See application file for complete search history.

(56) References Cited

U.S. PATENT DOCUMENTS

| | | | |
|---|---|---|---|
| 5,111,506 A | * | 5/1992 | Charpentier ......... H04R 25/505 381/323 |
| 6,819,166 B1 | | 11/2004 | Choi et al. |
| 7,733,997 B2 | | 6/2010 | Lai et al. |
| 7,940,839 B2 | | 5/2011 | Lapointe et al. |
| 9,525,386 B2 | | 12/2016 | Ide et al. |
| 9,544,170 B2 | | 1/2017 | Farjad-Rad |
| 9,602,314 B1 | | 3/2017 | Chang |

(Continued)

FOREIGN PATENT DOCUMENTS

| | | |
|---|---|---|
| KR | 10-2002-0097336 A | 12/2002 |
| KR | 10-2006-0044086 A | 5/2006 |

(Continued)

OTHER PUBLICATIONS

Lee, et al. "4.5Gsps MIPI D-PHY Receiver Circuit for Automatic Test Equipment", Sep. 2022, 5 pages total.

*Primary Examiner* — Usman A Khan
(74) *Attorney, Agent, or Firm* — Sughrue Mion, PLLC (57) ABSTRACT

An image sensor test system includes a test device configured to transmit an input signal and a control signal to at least one image sensor through a probe card, and an interface board configured to map the probe card and the test device to each other. The interface board includes a signal receiver configured to receive an image signal from the at least one image sensor, amplify the image signal, and output the image signal to the test device, and the signal receiver includes an operational amplifier configured to amplify the image signal, and a low-frequency attenuator connected to an output terminal of the operational amplifier.

18 Claims, 5 Drawing Sheets

(56) References Cited

U.S. PATENT DOCUMENTS

| | | | |
|---|---|---|---|
| 10,938,400 B1 | 3/2021 | Stein et al. | |
| 2006/0256321 A1* | 11/2006 | Dolne | G01J 9/00 |
| | | | 356/121 |
| 2007/0162800 A1 | 7/2007 | Tanaka | |
| 2009/0085590 A1 | 4/2009 | Berry et al. | |
| 2010/0110288 A1* | 5/2010 | Ritter | H04N 7/102 |
| | | | 348/E5.009 |
| 2012/0169367 A1 | 7/2012 | Kuo et al. | |
| 2014/0145745 A1* | 5/2014 | Ryu | G01R 31/2889 |
| | | | 324/762.01 |
| 2015/0048861 A1 | 2/2015 | Kuo et al. | |
| 2015/0137882 A1* | 5/2015 | Ciubotaru | H03H 11/126 |
| | | | 327/558 |
| 2015/0212155 A1 | 7/2015 | Chen et al. | |
| 2017/0108548 A1 | 4/2017 | Kang et al. | |
| 2018/0156842 A1 | 6/2018 | Kim et al. | |
| 2020/0284822 A1 | 9/2020 | Whittington | |
| 2020/0321926 A1 | 10/2020 | Moore et al. | |

FOREIGN PATENT DOCUMENTS

| | | |
|---|---|---|
| KR | 10-2007-0053719 A | 5/2007 |
| KR | 10-2015-0062030 A | 6/2015 |
| KR | 10-2015-0088706 A | 8/2015 |
| KR | 10-2017-0045588 A | 4/2017 |
| KR | 10-2017-0051745 A | 5/2017 |
| KR | 10-2018-0065422 A | 6/2018 |
| WO | 2009/042731 A1 | 4/2009 |
| WO | 2015/058166 A2 | 4/2015 |

* cited by examiner

IMAGE SENSOR TEST SYSTEM INCLUDING OPERATIONAL AMPLIFIER AND LOW-FREQUENCY ATTENUATOR

CROSS-REFERENCE TO RELATED APPLICATION(S)

This application is based on and claims priority to Korean Patent Application No. 10-2022-0056548, filed on May 9, 2022 in the Korean Intellectual Property Office, the disclosure of which is incorporated herein by reference in its entirety.

BACKGROUND

1. Field

One or more example embodiments of the disclosure relates to an image sensor test system.

2. Description of Related Art

An image sensor is a device converting image data into an electrical video signal, and may include a charge-coupled device (CCD), a complementary metal oxide semiconductor (CMOS), or the like. In a process of manufacturing an image sensor, a test of photoelectric conversion characteristics is required to determine whether the image sensor is defective. A test of an image sensor includes a pre-process test, performed in a state in which the image sensor is formed on a semiconductor wafer, and a post-process test performed after the image sensor is assembled to be packaged.

Unlike general semiconductor products, an image sensor may be tested through a process of testing electrical defects and a process of testing optical defects. In an optical test, a defect is determined by irradiating light generated by a light source to an image sensor and detecting the degree of the light response of pixels.

In a test device for testing an image sensor, an effective transmission distance for restoring a received signal is suggested to be 10 cm or less in a D-PHY signal standard of a mobile industry processor interface (MIPI), which is an interface between a signal receiver and the test device. However, since a length of a transmission line between an interface board and a test system is 1 m, use of a related art signal receiver may cause an increase in signal loss, resulting in difficulty in normal use of the test device.

Information disclosed in this Background section has already been known to or derived by the inventors before or during the process of achieving the embodiments of the present application, or is technical information acquired in the process of achieving the embodiments. Therefore, it may contain information that does not form the prior art that is already known to the public.

SUMMARY

Provided is an image sensor test system which may transmit an image signal even at a distance exceeding an effective transmission distance suggested in a MIPI D-PHY signal standard, may implement a signal receiver optimized for characteristics of a transmission line, and may be manufactured at low cost.

Additional aspects will be set forth in part in the description which follows and, in part, will be apparent from the description, or may be learned by practice of the presented embodiments.

According to an aspect of an example embodiment, an image sensor test system may include a test device configured to transmit an input signal and a control signal to at least one image sensor through a probe card, and an interface board configured to map the probe card and the test device to each other. The interface board may include a signal receiver configured to receive an image signal from the at least one image sensor, amplify the image signal, and output the image signal to the test device, and the signal receiver may include an operational amplifier configured to amplify the image signal, and a low-frequency attenuator connected to an output terminal of the operational amplifier.

According to an aspect of an example embodiment, an image sensor test system may include a probe card including a probe contacting at least one image sensor, a test device configured to transmit input and control signals to the at least one image sensor through the probe card, and an interface board configured to map the probe card and the test device to each other. The interface board may include a signal receiver configured to receive an image signal from the at least one image sensor, amplify the image signal, and output the image signal to the test device, and the signal receiver may include an operational amplifier configured to amplify the image signal, and a low-frequency attenuator connected to at least one of an input terminal and an output terminal of the operational amplifier.

According to an aspect of an example embodiment, an image sensor test system may include a probe card including a probe contacting at least one image sensor, a test device configured to transmit input and control signals to the at least one image sensor through the probe card, and an interface board configured to map the probe card and the test device to each other, the interface board including a mobile industry processor interface (MIPI) D-PHY configured to communicate with the test device based on a MIPI. The interface board may further include a signal receiver configured to receive an image signal from the at least one image sensor, amplify the image signal, and output the image signal to the test device, and the signal receiver may include an operational amplifier configured to amplify the image signal, and a low-frequency attenuator connected to at least one of an input terminal and an output terminal of the operational amplifier, the low-frequency attenuator including a resistor element and a capacitor element connected to the resistor element in parallel.

BRIEF DESCRIPTION OF DRAWINGS

The above and other aspects, features, and advantages of certain example embodiments of the present disclosure will be more apparent from the following description taken in conjunction with the accompanying drawings, in which.

DETAILED DESCRIPTION

Hereinafter, example embodiments will be described with reference to the accompanying drawings.

Figure 1:
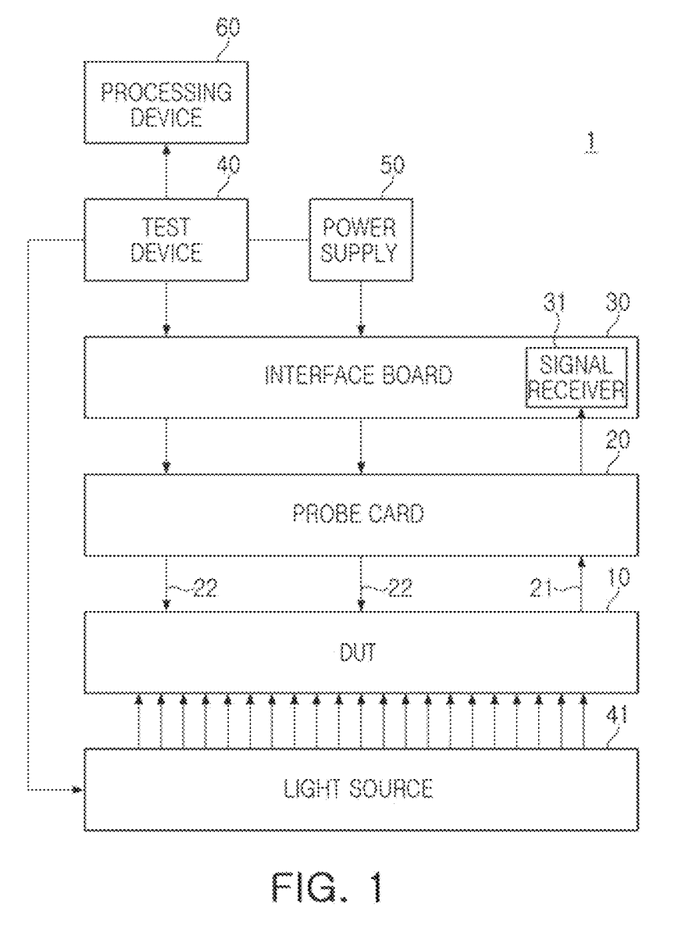
FIG. 1 is a diagram of a test system according to an example embodiment.

FIG. 1 is a diagram of a test system 1 according to an example embodiment.

Referring to FIG. 1, the test system 1 may include a device under test (DUT) 10, a test target, a probe card 20 directly electrically connected to the DUT 10 using probes 21 and 22, and an interface board 30 mapping the probe card 20 and a test device 40 to each other.

The DUT 10 may be a test target. In an example embodiment, the DUT may be a complementary metal-oxide-semiconductor (CMOS) image sensor. For example, the DUT 10 may include a plurality of CMOS image sensors provided on a wafer, or a CMOS image sensor provided in the form of a package.

The CMOS image sensor may be divided into a CMOS image sensor (CIS) unit and an image signal processing (ISP) unit. The CIS unit may encode the amount of input light. The ISP unit may perform image processing to reconstruct a signal, encoded by the CIS unit, through interpolation. The CIS unit and the ISP unit may be formed as individual chips, or may be formed as a single chip using system-on-chip (SOC) technology. The CIS unit may include a plurality of pixels arranged in a matrix at intersections of a plurality of rows and a plurality of columns. Each of the plurality of pixels transforms an electric charge, induced by input light, into a voltage. The voltage, generated in an analog form from each of the plurality of pixels, may be transformed into digital data through correlated double sampling (CDS). The digital data may be input to the ISP unit, and may then be reconstructed as an image signal.

The probe card 20 may include probes 21 and 22 directly electrically connected to the DUT 10, and the number of the probes 21 and 22 may correspond to the number of input/output pads or pins of the DUT 10.

The interface board 30 may serve to map the probe card 20 and the test device 40 to each other. The interface board 30 may include a signal receiver 31 receiving and amplifying an output signal of the DUT 10. An image signal of the DUT 10, output through the probe card 20, may be a low voltage signal of about 0.1V to about 0.3V, and the test device 40 may recognize an input signal when the input signal is a signal of about 0.6V. Accordingly, when the image signal output from the DUT 10 is not appropriately amplified, the test device 40 may not recognize the image signal output from the DUT 10. In an example embodiment, the signal receiver 31 included in the interface board 30 may receive and amplify the output signal of the DUT 10 and may convert the amplified output signal into a signal which may be recognized by the test device 40.

The signal receiver 31 may receive the image signal of the DUT 10 transmitted from the output probe 21 of the probe card 20. The signal receiver 31 may transmit an image signal to the test device 40. In the test system 1, several image sensors may be simultaneously tested to improve productivity. During the test, a distance between the signal receiver 31 and the test device 40 may be increased. In a D-PHY signal standard of a mobile industry processor interface (MIPI), which may be an interface between the signal receiver 31 and the test device 40, an effective transmission distance for recovering a received signal may be 10 cm or less. However, since a length of a transmission line between the interface board 30 and the test system 1 is 1 m, use of a conventional signal receiver may cause an increase in loss of the test device 40, resulting in difficulty in normal use of the image signal. When the transmission distance is increased, in particular, loss of high-frequency components in the image signal may be increased. Considering that the DUT 10 gradually outputs high-speed image signals, it may be substantially difficult to use the test device 40. The signal receiver 31, included in the interface board 30 of an example embodiment, may optimize and amplify the received image signal depending on characteristics of the transmission line before transmission to the test device 40. Therefore, the effective transmission distance may be significantly increased. A process in which a signal is amplified in the signal receiver 31 will be described later.

The test device 40 may be connected to the DUT 10 through the interface board 30 and the probe card 20. For example, the signal output from the test device 40 may be input to the DUT 10 through the interface board 30 and the input probe 22 of the probe card 20. In addition, the image signal output from the DUT 10 may be input to the test device 40 through the output probe 21 of the probe card 20 and the interface board 30. For example, the test device 40 may be implemented as a field programmable gate array (FPGA).

Figure 2:
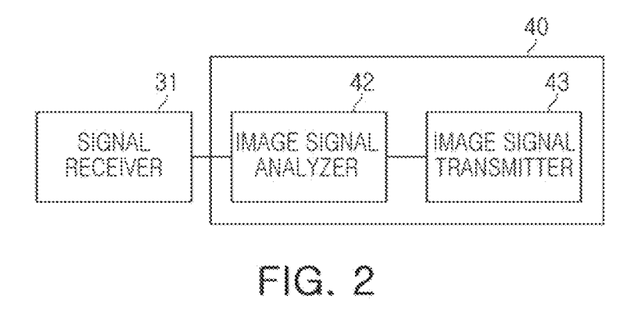
FIG. 2 is a diagram of an output receiver of FIG. 1 according to an example embodiment.

FIG. 2 is a diagram of an output receiver of FIG. 1 according to an example embodiment. As shown in FIG. 2, the test device 40 may include an image signal analyzer 42, and an image data transmitter 43. The image signal analyzer 42 may receive a high-speed serial signal from the signal receiver 31 to generate image data, and may transmit the image data to the image data transmitter 43. In this case, when the high-speed serial signal is distorted, normal image data may not be generated while the image signal analyzer 42 generates image data. The image data transmitter 43 may transmit the image data to a processing device 60.

The test system 1 may be connected to a light source 41, emitting an input (for example, light) to the DUT 10. The test device 40 may control the light source 41 to input light having various illuminances to the DUT 10. In response to the light output from the light source 41, the DUT 10 may transmit the output image signal to the signal receiver 31 through the output probe 21 of the probe card 20.

Referring to FIG. 2, the image signal output from the signal receiver 31 may be transmitted to the image signal analyzer 42 of the test device 40, and the image signal transmitted to the image signal analyzer 42 may be transmitted to the image data transmitter 43. The image signal transmitted to the image data transmitter 43 may be transmitted to the processing device 60. The processing device 60 may convert the image signal, transmitted from the test device 40, into a two-dimensional image and may determine pass or failure of the DUT 10. The processing device 60 according to an example embodiment may be implemented as a personal computer. In addition, the processing device 60 of an example embodiment may be implemented as a workstation, a server, a mainframe computer, a supercomputer, a processor, and the like.

The power supply 50 may supply power for operating the test device 40 and the interface board 30.

A process, in which the image signal received by the signal receiver 31 is amplified, will be described with reference to FIGS. 3 to 5C.

Figure 3:
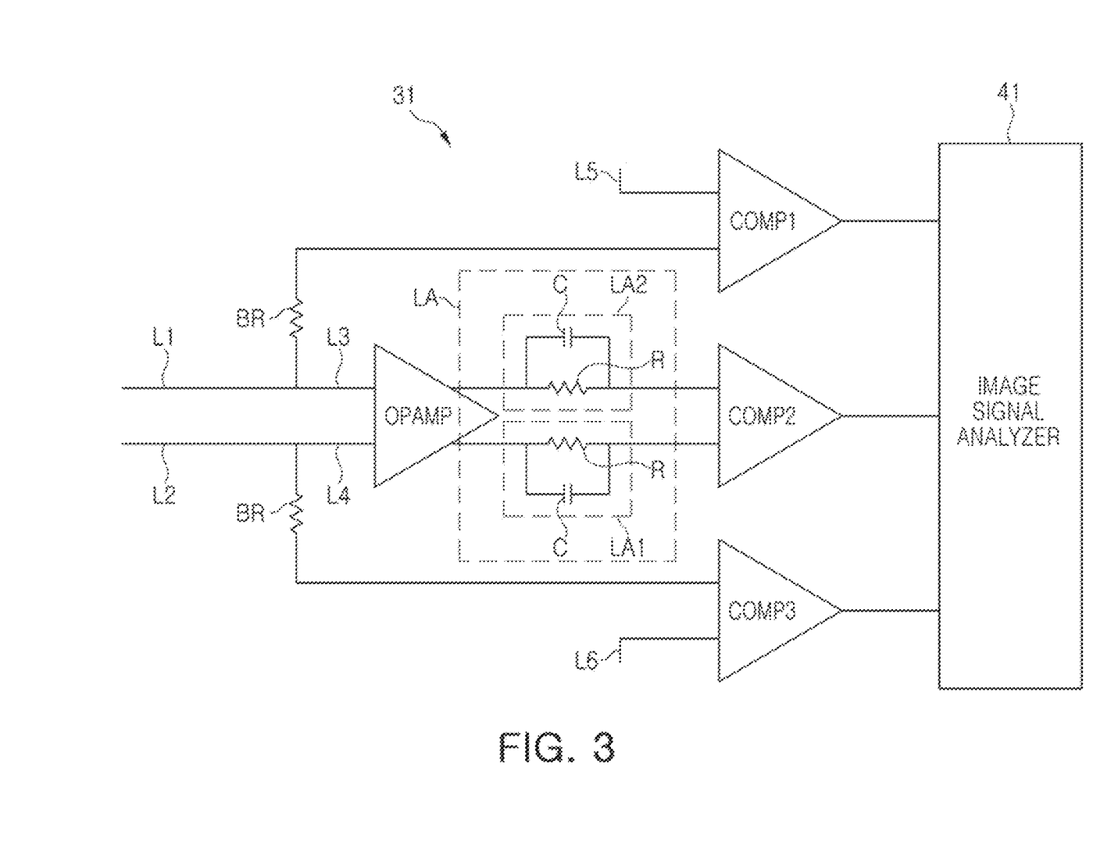
FIG. 3 is a diagram of a signal receiver of FIG. 2 according to an example embodiment.

FIG. 3 is a diagram of a signal receiver of FIG. 2 according to an example embodiment. Referring to FIG. 3, the signal receiver 31 may be configured according to a MIPI D-PHY signal standard, among a physical layer of MIPI, and may further include an operational amplifier OPAMP and a low-frequency attenuator LA. For example, the signal receiver 31 may include first to third comparators COMP1, COMP2, COMP3, first and second branch resistors BR1 and BR2, an operational amplifier OPAMP, and a low-frequency attenuator LA.

The first comparator COMP1 and the third comparator COMP3 may operate in a low-power mode, and the second comparator COMP2 may operate in a high-speed operation mode. Outputs of the first to third comparators COMP1, COMP2, and COMP3 may be transmitted to the image signal analyzer 42 of the test device 40.

The image signal output from the DUT 10 may be transmitted to first and second lines L1 and L2 of the signal receiver 31 through the probe card 20. The first and second lines L1 and L2 may receive image signals in a high-speed serial differential standard.

The image signals input through the first and second lines L1 and L2 may be input to the third and fourth lines L3 and L4, input terminals of the operational amplifier OPAMP. The operational amplifier OPAMP may be a differential amplifier or a commercial device. Also, the operational amplifier OPAMP may have a bandwidth of about 1.5 times or more of a bandwidth of the input image signal. When the bandwidth of the operational amplifier OPAMP is less than one times the bandwidth of the input image signal, it may be difficult to substantially amplify the image signal. In addition, when the bandwidth of the operational amplifier OPAMP is more to less than 1.5 times of the bandwidth of the input image signal, the signal may be insufficiently restored due to an insufficient margin.

The low-frequency attenuator LA may be disposed on an output terminal of the operational amplifier OPAMP to attenuate a low-frequency signal included in the image signal output from the operational amplifier OPAMP to the second comparator COMP2. However, example embodiments are not limited thereto. In example embodiments, the low-frequency attenuator LA may be disposed on an input terminal of the operational amplifier OPAMP. For example, the low-frequency attenuator LA may include a first low-frequency attenuator LA1 and a second low-frequency attenuator LA2, and the first and second low-frequency attenuators LA1 and LA2 may include the same circuit element. Each of the first and second low-frequency attenuators LA1 and LA2 may include a commercial device. For example, each of the first and second low-frequency attenuators LA1 and LA2 may have a structure in which a resistor element R and a capacitor element C are connected to each other in parallel. According to an example embodiment, each of the first and second low-frequency attenuators LA1 and LA2 may have a structure in which a resistor element and an inductor element are connected to each other in series. Each of the first and second low-frequency attenuators LA1 and LA2 may be disposed between the output terminal of the operational amplifier OPAMP and an input terminal of the second comparator COMP2. Therefore, both the operational amplifier OPAMP and the low-frequency attenuator LA of an example embodiment may include commercial elements, such that that the signal receiver 31 may be fabricated at low cost, as compared with the case in which each of the operational amplifier OPAMP and the low-frequency attenuator LA includes an application specific integrated circuit (ASIC).

In addition, the image signal input through the first and second lines L1 and L2 may be transmitted to the first and third comparators COMP1 and COMP3 or the second comparator COMP2 according to resistances of first and second branch resistors BR1 and BR2. A reference voltage Vref may be applied to fifth and sixth lines L5 and L6. The reference voltage Vref may be applied to the first comparator COMP1 and the third comparator COMP3.

An operation of the signal receiver 31 of an example embodiment will be described with reference to FIGS. 3, 4, 5A, 5B and 5C.

Figure 4:
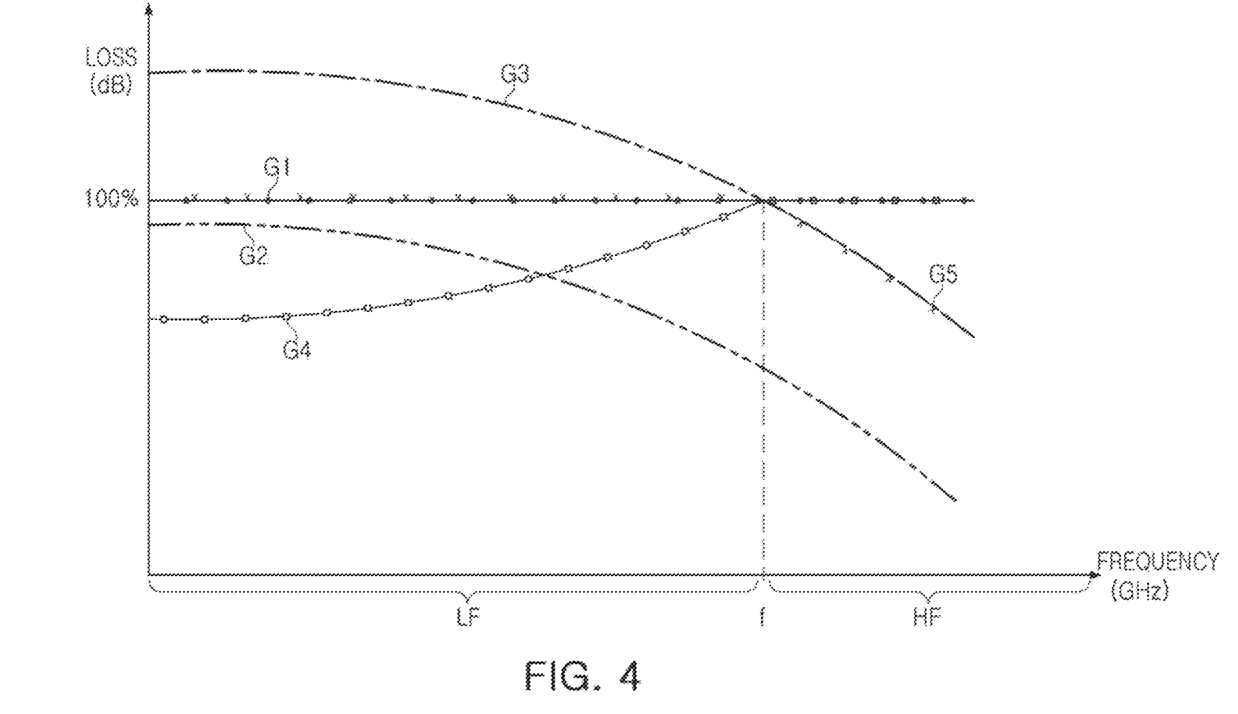
FIG. 4 is a graph illustrating a process in which a signal is amplified in the signal receiver of FIG. 3 according to an example embodiment.
Figure 5A:
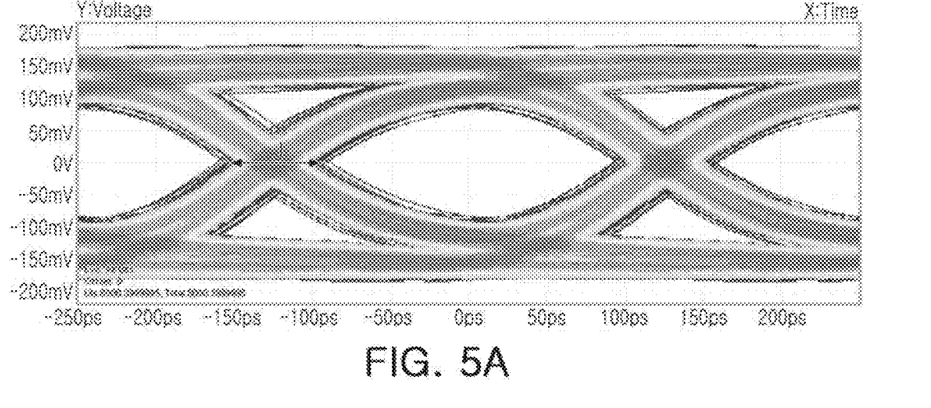
FIG. 5A is an eye diagram of a signal output from a probe card of FIG. 1; according to an example embodiment
Figure 5B:
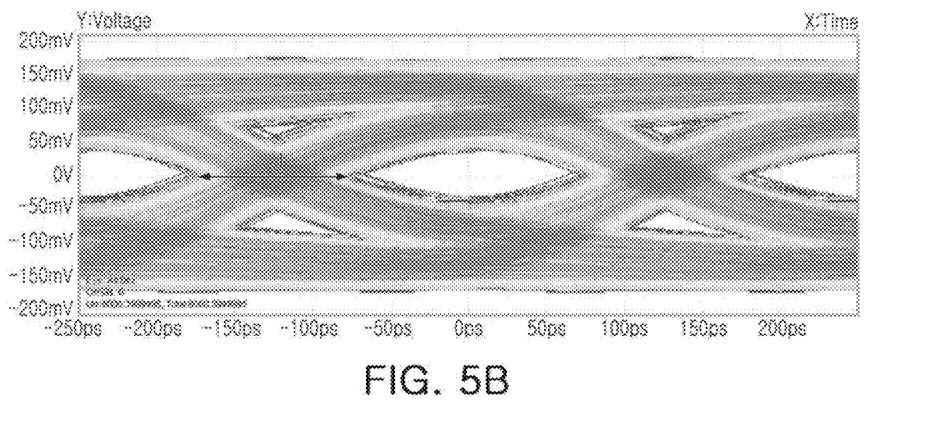
FIG. 5B is an eye diagram of a signal received in an interface board; according to an example embodiment.
Figure 5C:
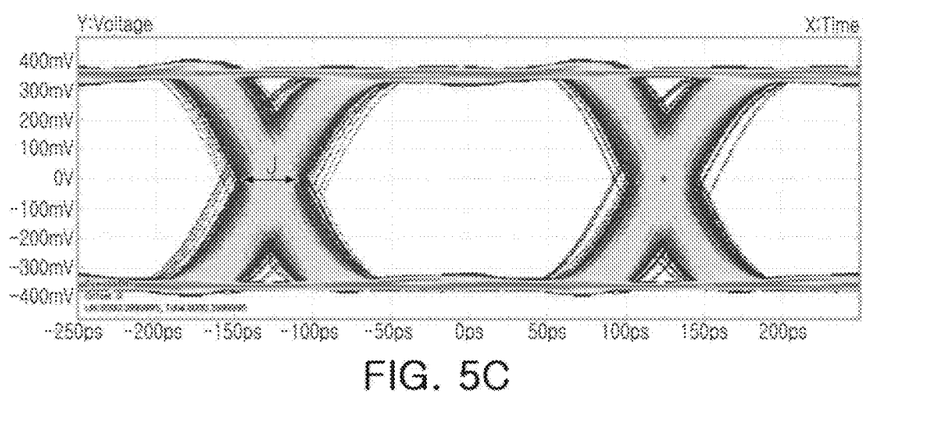
FIG. 5C is an eye diagram of a signal output from a signal receiver; according to an example embodiment.

FIG. 4 is a graph illustrating a process in which a signal is amplified in the signal receiver of FIG. 3 according to an example embodiment. FIG. 5A is an eye diagram of a signal output from a probe card of FIG. 1; according to an example embodiment. FIG. 5B is an eye diagram of a signal received in an interface board; according to an example embodiment. FIG. 5C is an eye diagram of a signal output from a signal receiver; according to an example embodiment.

In FIG. 4, G1 is a line representing an image signal output from the DUT 10. FIG. 5A is an eye diagram of an image signal output from the DUT 10 according to line G1, and a jitter J of the image signal output from the DUT 10 was measured to be about 30%.

In FIG. 4, G2 is a line representing an image signal input to the first and second lines L1 and L2 of the signal receiver 31 through the probe card 20. From the line G2, it may be seen that a high-frequency signal HF is lost while the image signal output from the DUT 10 passes through a transmission line between the probe card 20 and the signal receiver 31. FIG. 5B is an eye diagram of an image signal corresponding to line G2 and transmitted to the first and second lines L1 and L2 of the signal receiver 31, and a high-frequency signal was attenuated while transmitting the image signal output from the DUT 10, such that that a jitter J of the high-frequency signal was measured to be about 51%.

In FIG. 4, G3 is a line representing an image signal amplified while passing through an operational amplifier (e.g., the OPAMP of FIG. 3). From the line G3, it may be seen that the image signal was evenly amplified over an entire frequency domain, so that a low-frequency signal LF was excessively amplified but the high-frequency signal HF was still lost.

In FIG. 4, G4 is a line representing frequency characteristics of a low-frequency attenuator LA. Referring to FIG. 3, the low-frequency attenuator LA may include the resistor element R and the capacitor element C connected to each other in parallel, allowing the high-frequency signal HF to pass therethrough as it is and attenuating the low-frequency signal LF. Accordingly, the low-frequency attenuator LA may attenuate the low-frequency signal LF and may amplify the high-frequency signal HF, such that an image signal corresponding to line G5 may be output. FIG. 5C is an eye diagram of an image signal corresponding to line G5 that is amplified in the signal receiver 31. In an example embodiment, the image signal was restored, such that a jitter J thereof was decreased to about 28%.

The above-configured image sensor test system 1 may include an operational amplifier OPAMP and a low-frequency attenuator LA in a signal receiver 31 to convert a low-voltage signal, output from the DUT 10, into a signal recognizable in the test device 40. In addition, the image signal input from the DUT 10 to the signal receiver 31 may be restored and output, such that the image signal may be transmitted to even the test device 40 disposed at a distance between the signal receiver 31 and the test device 40 exceeding an effective transmission distance suggested in the MIPI D-PHY signal standard.

In addition, since the image sensor test system 1 according to an example embodiment may freely change the operational amplifier OPAMP and the low-frequency attenuator LA depending on characteristics of a transmission line, the signal receiver 31 optimized for the characteristics of the transmission line may be implemented.

Figure 6A:
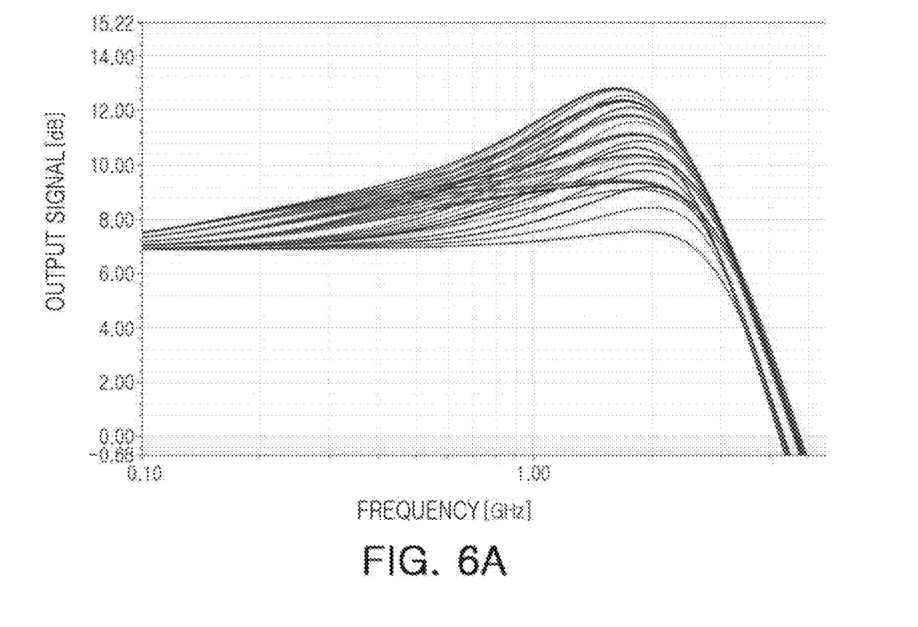
FIG. 6A is a graph illustrating an amplifiable frequency band in a signal receiver according to an example embodiment.
Figure 6B:
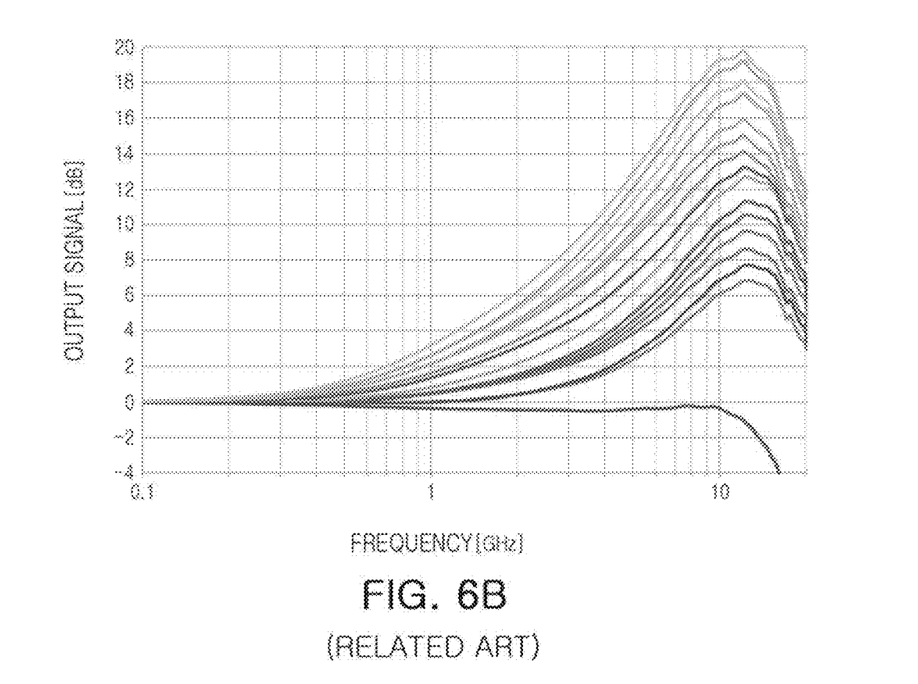
FIG. 6B is a graph illustrating an amplifiable frequency band in a signal receiver according to a related art example.

FIG. 6A is a graph illustrating an amplifiable frequency band in a signal receiver according to an example embodiment. FIG. 6B is a graph illustrating an amplifiable frequency band in a signal receiver according to a related art example.

That is, FIG. 6A illustrates frequency amplification characteristics of the signal receiver 31 according to an example embodiment, and locations of pole and zero may be adjusted, and FIG. 6B illustrates frequency amplification characteristics of the signal receiver according to a related art example, and only a gain may be adjusted.

In addition, since each of the operational amplifier OPAMP and the low-frequency attenuator LA included in the image sensor test system 1 according to an example embodiment may include a commercial device, the operational amplifier OPAMP and the low-frequency attenuator LA may be fabricated at low cost.

As described above, example embodiments may provide an image sensor system which may transmit an image signal even at a distance exceeding an effective transmission distance suggested in a MIPI D-PHY signal distance, may implement a signal receiver optimized for characteristics of a transmission line, and may be fabricated at low cost.

An operational amplifier and a low-frequency attenuator may be included in a signal receiver to optimize and amplify a received image signal, according to characteristics of a transmission line before a signal is transmitted to a test device. Therefore, an effective transmission distance may be significantly increased.

At least one of the components, elements, modules or units (collectively "components" in this paragraph) represented by a block in the drawings may be embodied as various numbers of hardware, software and/or firmware structures that execute respective functions described above. At least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like.

Although the disclosure been described in connection with some embodiments illustrated in the accompanying drawings, it will be understood by one of ordinary skill in the art that variations in form and detail may be made therein without departing from the spirit and essential feature of the disclosure. The above disclosed embodiments should thus be considered illustrative and not restrictive.

What is claimed is:

1. An image sensor test system comprising:
a test device configured to transmit an input signal and a control signal to at least one image sensor through a probe card; and
an interface board configured to map the probe card and the test device to each other,
wherein the interface board comprises a signal receiver configured to receive an image signal from the at least one image sensor, amplify the image signal, and output the image signal to the test device, and
wherein the signal receiver comprises:
an operational amplifier configured to amplify the image signal,
a low-frequency attenuator connected to an output terminal of the operational amplifier, and
a first comparator, a second comparator, and a third comparator,
wherein the second comparator is connected to an output terminal of the low-frequency attenuator,
wherein the first comparator and the third comparator are configured to operate in a low-power mode, and
wherein the second comparator is configured to operate in a high-speed operation mode.

2. The image sensor test system of claim 1, wherein the interface board further comprises a mobile industry processor interface (MIPI) D-PHY configured to communicate with the test device based on a MIPI.

3. The image sensor test system of claim 1, wherein the low-frequency attenuator comprises:
a resistor element; and
a capacitor element connected to the resistor element in parallel.

4. The image sensor test system of claim 3, wherein each of the operational amplifier, the resistor element, and the capacitor element comprises a discrete device.

5. The image sensor test system of claim 1, wherein the signal receiver further comprises:
a first branch resistor and a second branch resistor branching from an input terminal of the operational amplifier;
wherein the first comparator comprises a first input terminal to which the first branch resistor is connected, and
wherein the third comparator comprises a second input terminal to which the second branch resistor is connected.

6. The image sensor test system of claim 1, wherein the operational amplifier comprises a differential amplifier.

7. The image sensor test system of claim 6, wherein the test device comprises:
an image signal analyzer configured to receive the image signal transmitted from the signal receiver, and output image data; and
an image data transmitter configured to transmit the image data output from the image signal analyzer to a processing device.

8. The image sensor test system of claim 7, wherein the processing device is configured to convert the image data transmitted from the image data transmitter into a two-dimensional image, and determine a pass or a failure of the at least one image sensor.

9. The image sensor test system of claim 1, wherein the test device is implemented as a field programmable gate array (FPGA).

10. An image sensor test system comprising:
a probe card comprising a probe contacting at least one image sensor;
a test device configured to transmit input and control signals to the at least one image sensor through the probe card; and
an interface board configured to map the probe card and the test device to each other,
wherein the interface board comprises a signal receiver configured to:
receive an image signal from the at least one image sensor,
amplify the image signal; and
output the image signal to the test device, and
wherein the signal receiver comprises:
an operational amplifier configured to amplify the image signal,
a low-frequency attenuator connected to at least one of an input terminal and an output terminal of the operational amplifier, and
a first comparator, a second comparator, and a third comparator,
wherein the second comparator is connected to an output terminal of the low-frequency attenuator,
wherein the first comparator and the third comparator are configured to operate in a low-power mode, and
wherein the second comparator is configured to operate in a high-speed operation mode.

11. The image sensor test system of claim 10, wherein the test device further comprises a light source configured to emit light to the at least one image sensor, and
wherein the signal receiver is configured to transmit the image signal output from the at least one image sensor to the test device in response to the light emitted from the light source.

12. The image sensor test system of claim 10, wherein the signal receiver further comprises:
a first branch resistor and a second branch resistor branching from an input terminal of the operational amplifier;
wherein the first comparator comprises a first input terminal to which the first branch resistor is connected, and
wherein the third comparator comprises a second input terminal to which the second branch resistor is connected.

13. The image sensor test system of claim 10, wherein the low-frequency attenuator comprises a first low-frequency attenuator and a second low-frequency attenuator connected to the output terminal of the operational amplifier,
wherein the first low-frequency attenuator comprises a first resistor element and a first capacitor element connected to the first resistor element in parallel,
wherein the second low-frequency attenuator comprises a second resistor element and a second capacitor element connected to the second resistor element in parallel,
wherein the first resistor element and the second resistor element have the same resistance, and
wherein the first capacitor element and the second capacitor element have the same capacitance.

14. The image sensor test system of claim 13, wherein each of the operational amplifier, the first resistor element, the second resistor element, the first capacitor element and the second capacitor element comprises a discrete device.

15. An image sensor test system comprising:
a probe card comprising a probe contacting at least one image sensor;
a test device configured to transmit input and control signals to the at least one image sensor through the probe card; and
an interface board configured to map the probe card and the test device to each other, the interface board comprising a mobile industry processor interface (MIPI) D-PHY configured to communicate with the test device based on a MIPI,
wherein the interface board further comprises a signal receiver configured to:
receive an image signal from the at least one image sensor,
amplify the image signal, and
output the image signal to the test device, and
wherein the signal receiver comprises:
an operational amplifier configured to amplify the image signal,
a low-frequency attenuator connected to at least one of an input terminal and an output terminal of the operational amplifier, the low-frequency attenuator comprising a resistor element and a capacitor element connected to the resistor element in parallel, and
a first comparator, a second comparator, and a third comparator,
wherein the second comparator is connected to an output terminal of the low-frequency attenuator,
wherein the first comparator and the third comparator are configured to operate in a low-power mode, and
wherein the second comparator is configured to operate in a high-speed operation mode.

16. The image sensor test system of claim 15, wherein the operational amplifier comprises a differential amplifier.

17. The image sensor test system of claim 15, wherein each of the operational amplifier, the resistor element, and the capacitor element comprises a discrete device.

18. The image sensor test system of claim 15, wherein the test device comprises:
an image signal analyzer configured to receive the image signal transmitted from the at least one image sensor, and output image data; and
an image data transmitter configured to transmit the image data output from the image signal analyzer to a processing device.

* * * * *